(12) United States Patent
Tsai

(10) Patent No.: US 11,007,833 B2
(45) Date of Patent: May 18, 2021

(54) PROPELLER SWITCHING SYSTEM OF AMPHIBIOUS AND REMOTELY CONTROLLED CAR

(71) Applicant: JASON TOYS & ELECTRONICS CO., LTD, New Taipei (TW)

(72) Inventor: Min-Lan Tsai, New Taipei (TW)

(73) Assignee: JASON TOYS & ELECTRONICS CO., LTD, New Taipei (TW)

( * ) Notice: Subject to any disclaimer, the term of this patent is extended or adjusted under 35 U.S.C. 154(b) by 0 days.

(21) Appl. No.: 16/524,488

(22) Filed: Jul. 29, 2019

(65) Prior Publication Data

US 2020/0238774 A1    Jul. 30, 2020

(30) Foreign Application Priority Data

Jan. 29, 2019    (TW) .................................. 10810322.1

(51) Int. Cl.
*B60F 3/00* (2006.01)
*B63H 19/08* (2006.01)
*B60K 23/00* (2006.01)
*G05D 1/00* (2006.01)

(52) U.S. Cl.
CPC ............ *B60F 3/0007* (2013.01); *B60K 23/00* (2013.01); *G05D 1/0011* (2013.01); *B60Y 2200/42* (2013.01)

(58) Field of Classification Search
CPC .......... B60F 3/00; B60F 3/0007; B60F 3/003; B60F 3/0061; B60Y 2200/42; G05D 1/0011
USPC .................................. 440/12.5, 12.51, 12.69
See application file for complete search history.

(56) References Cited

U.S. PATENT DOCUMENTS 3,595,199 A * 7/1971 Faxas ..................... B60F 3/0007
440/12.69
7,478,817 B1 * 1/2009 Carrier ..................... B60F 3/003
169/52

FOREIGN PATENT DOCUMENTS

| CN | 1447761 A | 10/2003 |
|---|---|---|
| CN | 204077271 U | 1/2015 |
| CN | 106080069 A | 11/2016 |
| CN | 108437709 A | 8/2018 |

* cited by examiner

*Primary Examiner* — Daniel V Venne
(74) *Attorney, Agent, or Firm* — Muncy, Geissler, Olds and Lowe, P.C.

(57) ABSTRACT

A propeller switching system of an amphibious and remotely controlled car is provided, including a controller, a transmission mechanism, a propeller mechanism, and a wheel driving mechanism. When an electronic device transmits an operation message and a first control message to the controller, a propeller rotates. When the electronic device transmits the operation message and a second control message to the controller, the wheels of the amphibious and remotely controlled car rotate.

6 Claims, 1 Drawing Sheet

PROPELLER SWITCHING SYSTEM OF AMPHIBIOUS AND REMOTELY CONTROLLED CAR

CROSS-REFERENCE TO RELATED APPLICATION

This application claims priority from Taiwan Patent Application No. 108103221, filed on Jan. 29, 2019, in the Taiwan Intellectual Property Office, the content of which is hereby incorporated by reference in its entirety for all purposes.

BACKGROUND OF THE INVENTION

1. Field of the Invention

The present invention relates to a transmission system of an amphibious and remotely controlled car. Particularly, the present invention relates to a propeller switching system of an amphibious and remotely controlled car.

2. Description of the Related Art

For some conventional types of amphibious and remotely controlled cars, the transmission mechanisms for travelling on the ground and on the surface of the water are different and independent. Therefore, the overall weight of the remotely controlled car would increase due to the configuration of a plurality of transmission mechanisms, which in turn leads to an increase in power consumption during the traveling process.

Some other conventional types of amphibious and remotely controlled cars utilize the same transmission mechanism for travelling on the ground and on the surface of the water. Thus, there are no need to configure different driving devices and hence increase the overall weight. Nonetheless, the performance would be restricted by the adaptability of the transmission elements on the ground or on the surface of the water, which may result in instable movement of the remotely controlled cars and additional power consumption of the car.

For the purpose of improving the drawbacks of the prior art, the inventor of the present invention provides a propeller switching system of an amphibious and remotely controlled car.

SUMMARY OF THE INVENTION

In view of the aforementioned problems, the purpose of the present invention is to provide a propeller switching system of an amphibious and remotely controlled car, including: a controller, a transmission mechanism, a propeller mechanism, and a wheel driving mechanism. The controller is connected to an electronic device of the amphibious and remotely controlled car. The transmission mechanism includes a first gear set, a first transmission shaft, and a second gear set. The first gear set is driven by the controller. One end of the first transmission shaft is fixed to the first gear set, and one other end of the first transmission shaft includes a transmission portion. One end of the second gear set is fixed to the first transmission shaft. The propeller mechanism includes a first servo motor, a propeller transmission member, and a propeller. The first servo motor is connected to the controller. The propeller transmission member is driven by the first servo motor. One end of the propeller transmission member is concaved to form a first accommodating space. The first accommodating space is further concaved to form a second accommodating space, and the first accommodating space and the second accommodating space are configured to dispose the transmission portion therein. The propeller is connected to one other end of the propeller transmission member. The wheel driving mechanism includes a second servo motor, a vehicular driving gear, and a second transmission shaft. The second servo motor is connected to the controller. The vehicular driving gear is driven by the second servo motor. The second transmission shaft is fixed to the vehicular driving gear and two ends thereof are respectively fixed to two wheels of the amphibious and remotely controlled car. When the electronic device transmits an operation message to the controller, the controller drives the first gear set to rotate according to the operation message and the first transmission shaft, the transmission member and the second gear set rotate accordingly. When the electronic device transmits a first control message to the controller, the controller controls the first servo motor to drive the propeller transmission member to move in a direction away from the first transmission shaft until the transmission portion being physically in contact with propeller transmission member at the inner sidewalls of the propeller transmission member defining the first accommodating space and leading the propeller transmission member to rotate, the controller controls the second servo motor to drive the vehicular driving gear to move in a direction away from the second gear set until the vehicular driving gear not being driven by the second gear set. When the electronic device transmits a second control message to the controller, the controller controls the first servo motor to drive the propeller transmission member to move in a direction toward the first transmission shaft until the transmission portion being disposed in the second accommodating space rather than being physically in contact with the propeller transmission member, and the controller controls the second servo motor to drive the vehicular driving gear to move in a direction toward the second gear set until the vehicular driving gear being physically in contact with the second gear set and being driven by the second gear set to rotate.

Preferably, the controller further may include a message processing element and a motor; the message processing element is connected to the motor, the first gear set is fixed to the motor via a third transmission shaft, the electronic device transmits the operation message to the message processing element, the message processing element drives the motor to rotate according to the operation message, and the motor drives the first gear set to rotate.

Preferably, the electronic device may transmit the first control message to the message processing element, and the message processing element drives the first servo motor and the second servo motor according to the first control message.

Preferably, the electronic device may transmit the second control message to the message processing element, and the message processing element drives the first servo motor and the second servo motor according to the second control message.

Preferably, a diameter of the second accommodating space may be larger than the diameter of the transmission portion, and the diameter of the transmission portion may be larger than the diameter of the first accommodating space; when the transmission portion is positioned in the first accommodating space, the transmission portion and the propeller transmission member tightly mesh with each other.

Preferably, the first gear set may include a plurality of first gears, the plurality of first gears mesh with each other, and the diameters of the plurality of first gears are inconsistent; the second gear set may include a plurality of second gears, the plurality of second gears mesh with each other, and the diameters of the plurality of second gears are inconsistent.

Preferably, the propeller switching system may further include a gearbox, wherein the second gear set and the vehicular driving gear are positioned in the gearbox; the first transmission shaft and the second transmission shaft pass through two sides of the gearbox, and one end of the second servo motor passes through one side of the gearbox to connect to the vehicular driving gear.

For the purpose of explaining the aforementioned purposes, technical features, and improvements of the present invention more obvious and understandable, the following description shall be explained in more detail with reference to the preferred embodiments together with related drawings.

DESCRIPTION OF THE PREFERRED EMBODIMENTS

Figure 1:
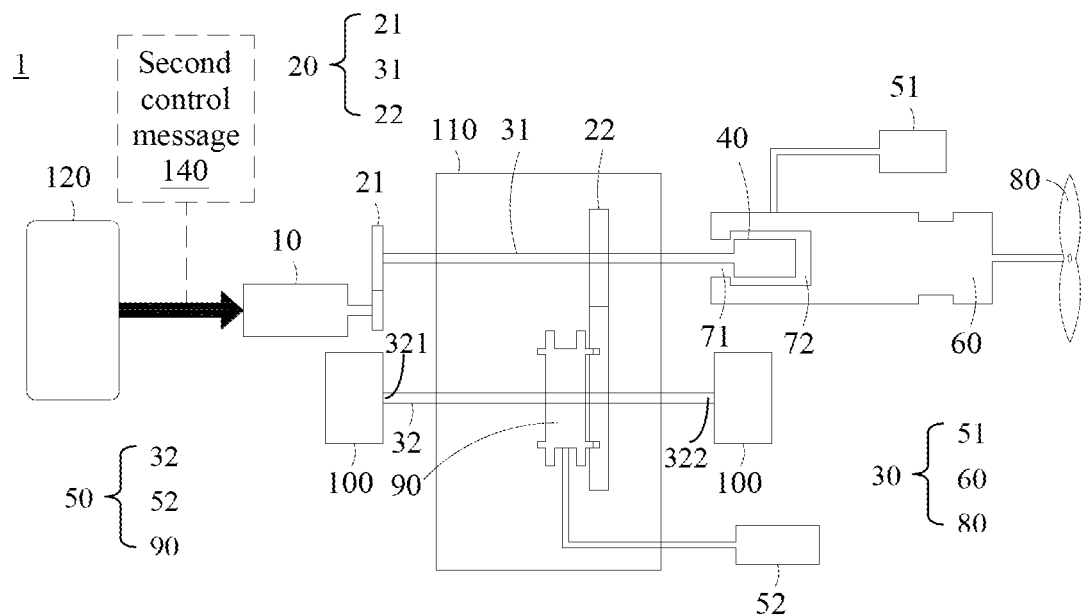
FIG. 1 depicts a schematic diagram of the first operation state of the propeller switching system of the amphibious and remotely controlled car according to the present invention.

In the present invention, it should be noted that the terms "connect," "concave" "transmit," "accommodating", and "drive" should be generally understood unless there is a specific regulation or restriction. The specific meanings of the aforementioned terms in the present invention shall specifically be understood by a person of ordinary skill in the art.

The embodiments of the propeller switching system of the amphibious and remotely controlled car of the present invention are to be explained with reference to the related drawings. For ease of understanding, the same elements in the following embodiments are symbolized by the same reference numerals.

Figure 2:
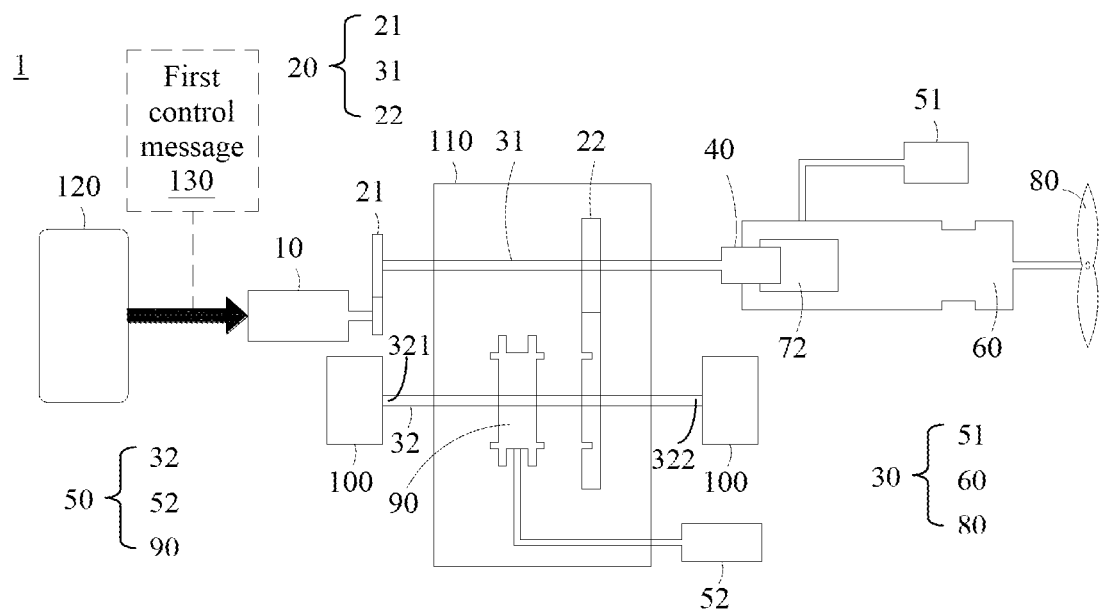
FIG. 2 depicts a schematic diagram of the second operation state of the propeller switching system of the amphibious and remotely controlled car according to the present invention.

Please refer to FIG. 1 and FIG. 2. FIG. 1 depicts a schematic diagram of the first operation state of the propeller switching system of the amphibious and remotely controlled car according to the present invention. FIG. 2 depicts a schematic diagram of the second operation state of the propeller switching system of the amphibious and remotely controlled car according to the present invention. As shown in FIGS. 1 and 2, the present invention aims to provide a propeller switching system of an amphibious and remotely controlled car, including a controller 10, a transmission mechanism 20, a propeller mechanism 30, and a wheel driving mechanism 50. The transmission mechanism 20 includes a first gear set 21, a first transmission shaft 31, and a second gear set 22. The first gear set 21 is driven by the controller 10. The first transmission shaft 31 includes a transmission member 40, and one end of the first transmission shaft 31 is fixed to the first gear set 21 and one other end of the first transmission shaft 31 is fixed to the second gear set 22. The propeller mechanism 30 includes a first servo motor 51, a propeller transmission member 60, and a propeller 80. The first servo motor 51 is connected to the controller 10. The propeller transmission member 60 is driven by the first servo motor 51, one end of the propeller transmission member 60 is concaved to form a first accommodating space 71, and further concaved to form a second accommodating space 72, and first accommodating space 71 and the second accommodating space 72 are configured to dispose the transmission portion 40. The propeller 80 is connected to one other end of the propeller transmission member 60. The wheel driving mechanism 50 includes a second servo motor 52, a vehicular driving gear 90, and a second transmission shaft 32. The second servo motor 52 is connected to the controller 10. The vehicular driving gear 90 is driven by the second servo motor 52. The second transmission shaft 32 is fixed to the vehicular driving gear 90. Two wheels 100 of the amphibious and remotely controlled car are respectively fixed to two ends 321, 322 of the second transmission shaft 32. An electronic device 120 of the amphibious and remotely controlled car is connected to the controller 10.

It is noted that the propeller transmission member 60 is driven by the first servo motor 51 via the gears and racks therebetween. Similarly, the vehicular driving gear 90 is driven by the second servo motor 52 via the gears and racks therebetween. The method applied thereto is known by a person of ordinary skill of the prior art.

When the electronic device 120 transmits an operation message to the controller 10, the controller 10 drives the first gear set 21 to rotate according to the operation message. The first gear set 21 then leads the first drive shaft 31 to rotate, and the first drive shaft 31 leads the second gear set 22 and the transmission member 40 to rotate. It is noted that the second gear set 22 would not directly lead the second drive shaft 32 and the two wheels 100 to rotate, as shown in FIG. 2, unless the vehicle drive gear 90 is physically in contact with the second gear set 22, as shown in FIG. 1. For the first operation state of the present invention, as shown in FIG. 1, the transmission portion 40 is positioned in the second accommodating space 72 and hence rotates without a load. Besides, the two wheels 100 rotate because the vehicle drive gear 90 is physically in contact with the second gear set 22. Once the electronic device 120 transmits a first control message 130 to the controller 10, the propeller switching system of the present invention is transferred from the first operation state as shown in FIG. 1 to the second operation state as shown in FIG. 2. In this case, the controller 10 controls the first servo motor 51 to drive the propeller transmission member 60 to move in the direction away from the first transmission shaft 31 until the transmission portion 40 is physically in contact with the propeller transmission member 60 at the inner sidewalls of the propeller transmission member 60 defining the first accommodating space 71. In this way, the rotation of the transmission member 40 leads the propeller transmission member 60 and the propeller 80 to rotate. Furthermore, the controller 10 controls the second servo motor 52 to drive the vehicular driving gear 90 to move in the direction away from the second gear set 22. In this way, the rotation of the second gear set 22 would not lead the vehicular driving gear 90 and the wheels 100 to rotate. Once the electronic device 120 transmits a second control message 140 to the controller 10, the propeller switching system of the present invention is transferred from the second operation state as shown in FIG. 2 to the first operation states as shown in FIG. 1. In this way, the controller 10 controls the first servo motor 51 to drive the propeller transmission member 60 to move in the direction toward the first transmission shaft 31 such that the transmission portion 40 is positioned in the second accommodating space 72 and hence rotates without a load. Furthermore, the controller 10 controls the second servo motor 52 to drive the vehicular driving gear 90 to move in the direction toward the second gear set 22 such that the vehicular driving gear 90 is in contact with the second gear set 22. In this way, the rotation of the second gear set 22 would lead the vehicular driving gear 90 to rotate, which leads the second drive shaft 32 and the two wheels 100 to rotate.

According to an embodiment of the present invention, the controller 10 may further include a message processing element and a motor. The message processing element is connected to the motor. The first gear set 21 is fixed to the motor via a third transmission shaft (not shown). The electronic device 120 transmits the operation message to the message processing element. The message processing element drives the motor to rotate according to the operation message. The motor in the controller 10 then drives the first gear set 21 to rotate.

According to the present embodiment, the electronic device 120 transmits the first control message 130 or the second control message 140 to the message processing element of the controller 10, and the message processing element of the controller 10 then controls the first servo motor 51 and the second servo motor 52 according to the first control message 130 or the second control message 140.

The diameter of the second accommodating space 72 may be larger than the diameter of the transmission portion 40, and the diameter of the transmission portion 40 corresponds to the diameter of the first accommodating space 71 such that the transmission portion 40 is able to engage the inner sidewalls of the propeller transmission member 60 defining the first accommodating space 71. When the transmission portion 40 is positioned in the first accommodating space 71, the transmission portion 40 and the propeller transmission member 60 tightly mesh with each other.

The first gear set 21 includes a plurality of first gears. The plurality of first gears mesh with each other, and the diameters of the plurality of first gears are inconsistent. The second gear set 22 includes a plurality of second gears, the plurality of second gears mesh with each other, and the diameters of the plurality of second gears are inconsistent.

The propeller switching system of the amphibious and remotely controlled car further includes a gearbox 110. The gearbox 110 is disposed in the remotely controlled car, and the second gear set 22 and the vehicular driving gear 90 are positioned in the gearbox 110. The first transmission shaft 31 and the second transmission shaft 32 both pass through two sides of the gearbox 110, and one end of the second servo motor 52 passes through one side of the gearbox 110 to connect to the vehicular driving gear 90. However, the aforementioned descriptions are only explained as examples and not restricted thereto.

The above description is merely illustrative rather than restrictive. Any equivalent modification or alteration without departing from the spirit and scope of the present invention should be included in the appended claims.

What is claimed is:

1. A propeller switching system of an amphibious and remotely controlled car, comprising:
   a controller, connected to an electronic device of the amphibious and remotely controlled car;
   a transmission mechanism, comprising:
      a first gear set, driven by the controller;
      a first transmission shaft, one end thereof being fixed to the first gear set, and one other end thereof comprising a transmission portion; and
      a second gear set, one end thereof being fixed to the first transmission shaft;
   a propeller mechanism, comprising:
      a first servo motor, connected to the controller;
      a propeller transmission member, driven by the first servo motor, one end thereof being concaved to form a first accommodating space, and further being concaved to form a second accommodating space, and the first accommodating space and the second accommodating space being configured to dispose the transmission portion therein; and
      a propeller, connected to one other end of the propeller transmission member; and
   a wheel driving mechanism, comprising:
      a second servo motor, connected to the controller;
      a vehicular driving gear, driven by the second servo motor; and
      a second transmission shaft, fixed to the vehicular driving gear and two ends thereof being respectively fixed to two wheels of the amphibious and remotely controlled car,
   wherein when the electronic device transmits an operation message to the controller, the controller drives the first gear set to rotate according to the operation message and the first transmission shaft, the transmission member and the second gear set rotate accordingly,
   wherein when the electronic device transmits a first control message to the controller, the controller controls the first servo motor to drive the propeller transmission member to move in a direction away from the first transmission shaft until the transmission portion being physically in contact with propeller transmission member at inner sidewalls of the propeller transmission member defining the first accommodating space and leading the propeller transmission member to rotate, the controller controls the second servo motor to drive the vehicular driving gear to move in a direction away from the second gear set until the vehicular driving gear not being driven by the second gear set,
   wherein when the electronic device transmits a second control message to the controller, the controller controls the first servo motor to drive the propeller transmission member to move in a direction toward the first transmission shaft until the transmission portion being disposed in the second accommodating space rather than being physically in contact with the propeller transmission member, and the controller controls the second servo motor to drive the vehicular driving gear to move in a direction toward the second gear set until the vehicular driving gear being physically in contact with the second gear set and being driven by the second gear set to rotate,
   wherein a diameter of the second accommodating space is larger than the diameter of the transmission portion, and
   wherein when the transmission portion is positioned in the first accommodating space, the transmission portion and the propeller transmission member tightly mesh with each other.

2. The propeller switching system of the amphibious and remotely controlled car according to claim 1, wherein the controller further comprises a message processing element and a motor; the message processing element is connected to the motor, the first gear set is fixed to the motor via a third transmission shaft, the electronic device transmits the operation message to the message processing element, the message processing element drives the motor to rotate according to the operation message, and the motor drives the first gear set to rotate.

3. The propeller switching system of the amphibious and remotely controlled car according to claim 2, wherein the electronic device transmits the first control message to the message processing element, and the message processing element drives the first servo motor and the second servo motor according to the first control message.

4. The propeller switching system of the amphibious and remotely controlled car according to claim 2, wherein the electronic device transmits the second control message to the message processing element, and the message processing element drives the first servo motor and the second servo motor according to the second control message.

5. The propeller switching system of the amphibious and remotely controlled car according to claim 1, wherein the first gear set comprises a plurality of first gears, the plurality of first gears mesh with each other, and the diameters of the plurality of first gears are inconsistent; the second gear set comprises a plurality of second gears, the plurality of second gears mesh with each other, and the diameters of the plurality of second gears are inconsistent.

6. The propeller switching system of the amphibious and remotely controlled car according to claim 1, further comprising a gearbox, wherein the second gear set and the vehicular driving gear are positioned in the gearbox; the first transmission shaft and the second transmission shaft pass through two sides of the gearbox, and one end of the second servo motor passes through one side of the gearbox to connect to the vehicular driving gear.

* * * * *